(12) United States Patent
Coldicott et al.

(10) Patent No.: US 9,535,978 B2
(45) Date of Patent: Jan. 3, 2017

(54) SEMANTIC MAPPING OF TOPIC MAP META-MODELS IDENTIFYING ASSETS AND EVENTS TO INCLUDE WEIGHTS

(71) Applicant: International Business Machines Corporation, Armonk, NY (US)

(72) Inventors: Peter A. Coldicott, Jonestown, TX (US); Thomas T. Hanis, Raleigh, NC (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/293,292

(22) Filed: Jun. 2, 2014

(65) Prior Publication Data

US 2014/0280228 A1    Sep. 18, 2014

Related U.S. Application Data

(63) Continuation-in-part of application No. 13/433,384, filed on Mar. 29, 2012, now Pat. No. 9,123,004.

(51) Int. Cl.
*G06F 17/30*    (2006.01)
*G06Q 10/06*    (2012.01)

(52) U.S. Cl.
CPC ......... *G06F 17/30616* (2013.01); *G06Q 10/06* (2013.01)

(58) Field of Classification Search
CPC ............... G06F 9/44; G06N 7/02; G06N 7/06; G06N 5/048; G06N 5/04; G06N 99/005
(Continued)

(56) References Cited

U.S. PATENT DOCUMENTS 7,467,145 B1 * 12/2008 Castellanos ............ G06Q 10/06
7,664,712 B1    2/2010 Duvall et al.
(Continued)

FOREIGN PATENT DOCUMENTS

WO    0042529 A1    7/2000
WO    2011065969 A2    6/2011
(Continued)

OTHER PUBLICATIONS

Kim et al, "Cause-and-Effect Function Analysis", Proceedings of the 2010 IEEE ICMIT.*
(Continued)

*Primary Examiner* — Stanley K Hill
*Assistant Examiner* — Ilya Traktovenko
(74) *Attorney, Agent, or Firm* — Brown & Michaels, PC; Isaac Gooshaw

(57) ABSTRACT

Determining an impact of an event identified in a first topic map meta-model will have on at least one asset identified in a second topic map meta-model representative of weight. A third topic map meta-model is created which maps at least one asset from the second topic map meta-model to an event from the first topic map meta-model and is comprised of: a topic map representation of assets of the second topic map meta-model and events of the first topic map meta-model, a topic map based index with instance ontology of the first and second topic map meta-models, identification of at least one association between an event identified in the first topic map meta-model and at least one asset identified in the second topic map meta-model; and weight assigned to the at least one association.

15 Claims, 11 Drawing Sheets

(58) Field of Classification Search
USPC .................................... 706/52, 46, 45, 62
See application file for complete search history.

(56) References Cited

U.S. PATENT DOCUMENTS

| | | | |
|---|---|---|---|
| 7,962,589 | B1 | 6/2011 | Parello et al. |
| 8,051,164 | B2 | 11/2011 | De Peuter et al. |
| 8,301,755 | B2 | 10/2012 | De Peuter et al. |
| 8,645,904 | B2 | 2/2014 | Coldicott et al. |
| 2004/0034652 | A1* | 2/2004 | Hofmann .......... G06F 17/30699 |
| 2005/0289166 | A1 | 12/2005 | Stanley et al. |
| 2007/0027666 | A1 | 2/2007 | Frankel |
| 2007/0074076 | A1* | 3/2007 | Imai .................... G06F 11/0709 714/26 |
| 2007/0130231 | A1 | 6/2007 | Brown et al. |
| 2007/0288219 | A1* | 12/2007 | Zafar .......................... G03F 1/84 703/14 |
| 2008/0033993 | A1 | 2/2008 | Uceda-Sosa |
| 2008/0125942 | A1 | 5/2008 | Tucker et al. |
| 2008/0307523 | A1 | 12/2008 | Subramanyam et al. |
| 2009/0157419 | A1 | 6/2009 | Bursey |
| 2009/0248488 | A1 | 10/2009 | Shah et al. |
| 2009/0287674 | A1* | 11/2009 | Bouillet ............ G06F 17/30884 |
| 2009/0299696 | A1* | 12/2009 | Shiihara ................. G06Q 10/10 702/181 |
| 2009/0327242 | A1 | 12/2009 | Brown et al. |
| 2010/0049564 | A1 | 2/2010 | Lewis et al. |
| 2010/0100546 | A1* | 4/2010 | Kohler .............. G06F 17/30017 707/739 |
| 2010/0162401 | A1 | 6/2010 | Sakaki et al. |
| 2010/0228693 | A1* | 9/2010 | Dawson ............... G06F 17/2705 706/12 |
| 2011/0099050 | A1* | 4/2011 | Coldicott ............... G06Q 10/06 705/7.37 |
| 2011/0099139 | A1* | 4/2011 | Coldicott ............... G06Q 10/06 706/47 |
| 2011/0099536 | A1* | 4/2011 | Coldicott ................. G06F 8/36 717/120 |
| 2011/0153636 | A1 | 6/2011 | Coldicott et al. |
| 2011/0169835 | A1 | 7/2011 | Cardno et al. |
| 2012/0016858 | A1 | 1/2012 | Rathod |
| 2012/0102371 | A1* | 4/2012 | Tonouchi ........... G05B 23/0275 714/49 |
| 2012/0155715 | A1* | 6/2012 | Buscema ................. G06F 17/18 382/113 |
| 2012/0278353 | A1* | 11/2012 | Carrato ............. G06F 17/30943 707/769 |
| 2013/0173523 | A1 | 7/2013 | Sanchez et al. |
| 2013/0262367 | A1 | 10/2013 | Coldicott et al. |
| 2014/0280228 | A1 | 9/2014 | Coldicott et al. |
| 2014/0282404 | A1 | 9/2014 | Gonsalves et al. |
| 2015/0066827 | A1 | 3/2015 | Brereton et al. |
| 2015/0081689 | A1 | 3/2015 | Marshall |
| 2015/0178300 | A1 | 6/2015 | Roy et al. |

FOREIGN PATENT DOCUMENTS

| | | |
|---|---|---|
| WO | 2011065969 A3 | 6/2011 |
| WO | 2012106922 A1 | 8/2012 |
| WO | 2013138969 A1 | 9/2013 |
| WO | 2013159639 A1 | 10/2013 |

OTHER PUBLICATIONS

Ruther, "Sharing Environmental Vocabulary", EnviroInfo 2004 (Geneva), p. 293-295, 18th International Conference "Informatics for Environmental Protection", Geneva, 2004.*
Potgieter et al, "Adaptive Bayesian agents: Enabling distributed social networks", S.Afr.J.Bus.Manage.2006, 37(1).*
Reusch et al, "Integrated Tool Sets for Business Games and Simulation", Computing, 2008, vol. 7, Issue 2, 59-65.*
Rouse, "Topic Map Query language (TMQI)", Sep. 2005.*
Ruther et al. "SNS Environmental Vocabulary—from Terms to Ontology", Semantics 2006 Vienna, Nov. 28-30, 2006.
Lacher, M. S. "On the Integration of Topic Maps and RDF Data", Extreme Markup Languages 2001; Montréal, Québec; Aug. 2001.
Weighted edges in topic maps, Google Forum Groups; retrieved from https://groups.google.com/forum/?fromgroups#!topic/ontopia/cBZqr73vOal; Oct. 2010.
Schaefer et al., Smarter City Series: Understanding the IBM approach to Traffic Management, 2011, http://ip.com/pdf/redbook/REDP473700.pdf.
Le Grand et al., Topic Maps, RDF Graphs and Ontologies Visualization, Jan. 1, 1999, http://www-rp.lip6.fr/~blegrand/Publis/VSW_book.pdf.
Heidinger et al. "Towards Collaborative Web-Based Impact Assessment", Proceedings of the 10th Annual International Conference on Digital Government Research: Social Networks: Making Connections between Citizens, Data and Government pp. 190-198; 2009.
Bailey et al. "Flavours of XChange, a Rule-Based Reactive Language for the (Semantic) Web", Rules and Rule Markup Languages for the Semantic Web; vol. 3791 of the series Lecture Notes in Computer Science pp. 187-192; Nov. 2005.
Ruther, M. "Sharing Environmental Vocabulary", EnviroInfo 2004 (Geneva), p. 293-295, 18th International Conference "Informatics for Environmental Protection", Geneva, 2004.
U.S. Appl. No. 14/018,872; Final Rejection dated Apr. 8, 2015.
U.S. Appl. No. 14/949,981; Non-Final Rejection dated May 20, 2016.
Hunter, J. "MetaNet A Metadata Term Thesaurus to Enable Semantic Interoperability Between Metadata Domains", Journal of Digital Information, vol. 1, No. 8, 2001.
U.S. Appl. No. 13/433,384; Non-Final Rejection dated May 1, 2014.
U.S. Appl. No. 13/433,384; Final Rejection dated Sep. 10, 2014.
U.S. Appl. No. 13/433,384; Non-Final Rejection dated Dec. 24, 2014.
U.S. Appl. No. 14/018,872; Non-Final Rejection dated Jul. 22, 2015.
U.S. Appl. No. 14/081,241; Non-Final Rejection dated Sep. 3, 2015.
U.S. Appl. No. 14/081,241; Final Rejection dated Mar. 11, 2016.
U.S. Appl. No. 14/081,241:Non-Final Rejection dated Sep. 20, 2016.
U.S. Appl. No. 14/018,872; Non-Final Rejection dated Sep. 20, 2016.
Fakcharoenphol et al. "Planar graphs, negative weight edges, shortest paths, and near linear time." Foundations of Computer Science, 2001. Proceedings. 42nd IEEE Symposium on. IEEE, 2001.

* cited by examiner

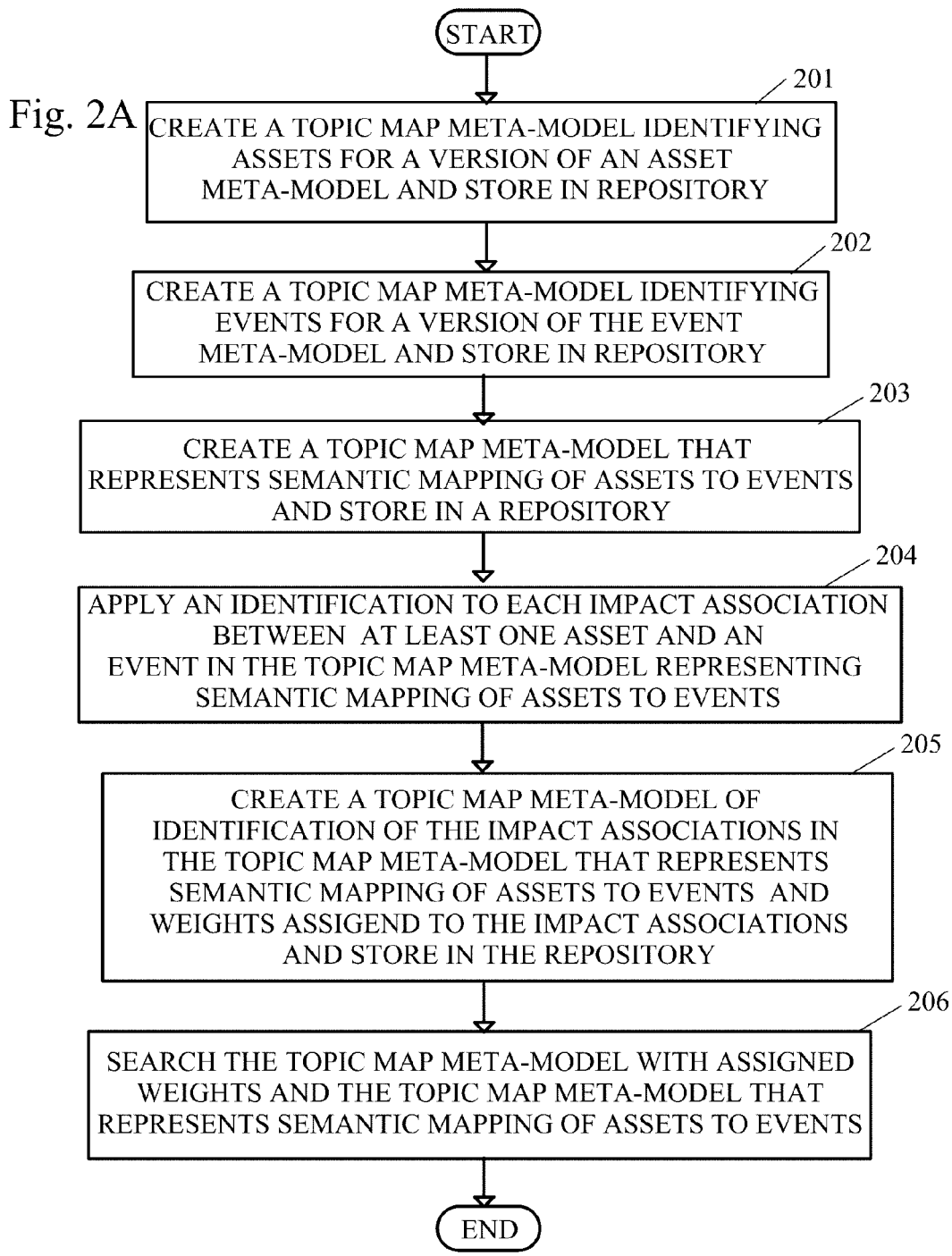

SEMANTIC MAPPING OF TOPIC MAP META-MODELS IDENTIFYING ASSETS AND EVENTS TO INCLUDE WEIGHTS

REFERENCE TO RELATED APPLICATIONS

This is a continuation-in-part of application Ser. No. 13/433,384, filed Mar. 29, 2012, entitled "PREDICTING AN EFFECT OF EVENTS ON ASSETS". The aforementioned application is hereby incorporated herein by reference.

TECHNICAL FIELD

The present invention relates to semantic mapping, and more specifically to semantic mapping of a first topic map meta-model identifying assets to a second topic map meta-model identifying events to form a third topic map meta-model that represents a semantic mapping of assets to events and assigning weights to the associations between the assets and events in the third topic map meta-model in various scopes identified within another topic map meta-model and storing the weights in a data structure, the weights being indicative of a possible impact of an event on one or more assets.

BACKGROUND

Manufacturing based companies have enormous investments in assets that are part of the operational processes that drive their business. Optimizing the use of those assets is critical to a company's operational effectiveness and therefore its bottom line.

The equipment or assets that run the manufacturing or production processes are generally connected to servers or controllers to generate operational data that can be used to monitor the manufacturing or production process. Typically, companies will collect the operational data and perform operational analysis to provide immediate performance characteristics that can often be represented in dashboards, score sheets, or reports. Information models can be used to represent how assets are deployed and the relationships between assets such as connections, associations or containment. Armed with both the model information and the "real time" operational data, organizations can perform current or future condition analyses on assets and asset groups.

Similarly, organizations may use event models to understand relationships between events within their physical infrastructure. These event models may be explicitly defined, or they could be implicit in the deployment of business operational processes. These processes could be programmatic, rule based, or supplied by a knowledge expert. But independent of how they are manifested, they represent relationships between events that occur within the operational process. For example, the event model would be able to tell a customer what response needs to occur if a critical piece of equipment is operating over a specific threshold, for example running too hot or consuming too much power.

SUMMARY

According to one embodiment of the present invention, a method of assigning a weight to an association between an event and an asset. The method comprising the steps of: the computer creating a first topic map meta-model that identifies assets and events in a topic map based index with instance ontology based on a topic map meta model that identifies assets and a topic map meta-model that identifies events; the computer assigning an identification in the first topic map meta-model to at least one association between at least one asset of the topic map meta-model that identifies assets and at least one event of the topic map meta-model that identifies events; and the computer creating a second topic map meta-model that identifies at least one association between at least one asset and at least one event in a topic map based index and instance ontology with weights assigned to the at least one association in various scopes.

According to another embodiment of the present invention, a computer program product for assigning a weight to an association between an event and an asset. The computer program product comprising a computer comprising at least one processor, one or more memories, one or more computer readable storage media, the computer program product comprising a computer readable storage medium having program instructions embodied therewith, the program instructions executable by the computer to perform a method comprising: creating, by the computer a first topic map meta-model that identifies assets and events in a topic map based index with instance ontology based on a topic map meta model that identifies assets and a topic map meta-model that identifies events; assigning, by the computer an identification in the first topic map meta-model to at least one association between at least one asset of the topic map meta-model that identifies assets and at least one event of the topic map meta-model that identifies events; and creating, by the computer a second topic map meta-model that identifies at least one association between at least one asset and at least one event in a topic map based index and instance ontology with weights assigned to the at least one association in various scopes.

According to another embodiment of the present invention, a computer system for assigning a weight to an association between an event and an asset. The system comprising a computer comprising at least one processor, one or more memories, one or more computer readable storage media having program instructions executable by the computer to perform the program instructions comprising: creating, by the computer a first topic map meta-model that identifies assets and events in a topic map based index with instance ontology based on a topic map meta model that identifies assets and a topic map meta-model that identifies events; assigning, by the computer an identification in the first topic map meta-model to at least one association between at least one asset of the topic map meta-model that identifies assets and at least one event of the topic map meta-model that identifies events; and creating, by the computer a second topic map meta-model that identifies at least one association between at least one asset and at least one event in a topic map based index and instance ontology with weights assigned to the at least one association in various scopes.

BRIEF DESCRIPTION OF THE SEVERAL VIEWS OF THE DRAWINGS

FIG. 2a shows a flowchart of a method of semantically mapping a first topic map meta-model identifying assets to a second topic map meta-model identifying events to form a third topic map meta model that represents semantic mapping of assets to events and assigning weights to the associations between the assets and events in the third topic map meta-model in various scopes identified within a meta-model and storing the weights in a data structure, the weights being indicative of a possible impact of an event on one or more assets of an illustrative embodiment.

DETAILED DESCRIPTION

The illustrative embodiments recognize that, for effective operations, companies want to be able to answer more complicated questions about the operations of their equipment and/or assets and the result of various types of events. Examples are questions like: "What are the implications of this piece of equipment exceeding a threshold to other assets in my enterprise?" "What are implications to assets that are related by proximity, direct or indirect physical connection based on configurations that exist now or that could change by operational cycles or time?" "What are the implications to the events that will be triggered by my operational choices to resolve the immediate threshold problem?" The illustrative embodiments recognize that these questions are critical to a highly effective operational process and span the boundaries typically maintained by asset models and event models individually.

The illustrative embodiments recognize that models, such as asset models and event models, are deployed in relative isolation and do not provide a semantic understanding between the models. The illustrative embodiments also recognize that simply expanding the model definitions to attempt to include any relationship across the separate models, sacrifices the benefits associated with specifically focused models. Illustrative embodiments provide for interaction between individual models so that the collective values of the individual models can be fully leveraged to drive optimal business efficiencies.

The term "weight" is defined as a quantifiable value assigned to an association between an event and at least one asset. In one embodiment, the weight represents a probability or the likelihood that the event will impact the asset(s). In another embodiment, the weight represents a cost or impact, for example a fractional multiplier representing an impact on the life span of the asset(s), or cost of replacing or repairing the asset based on the impact of the event on the asset.

Figure 1:
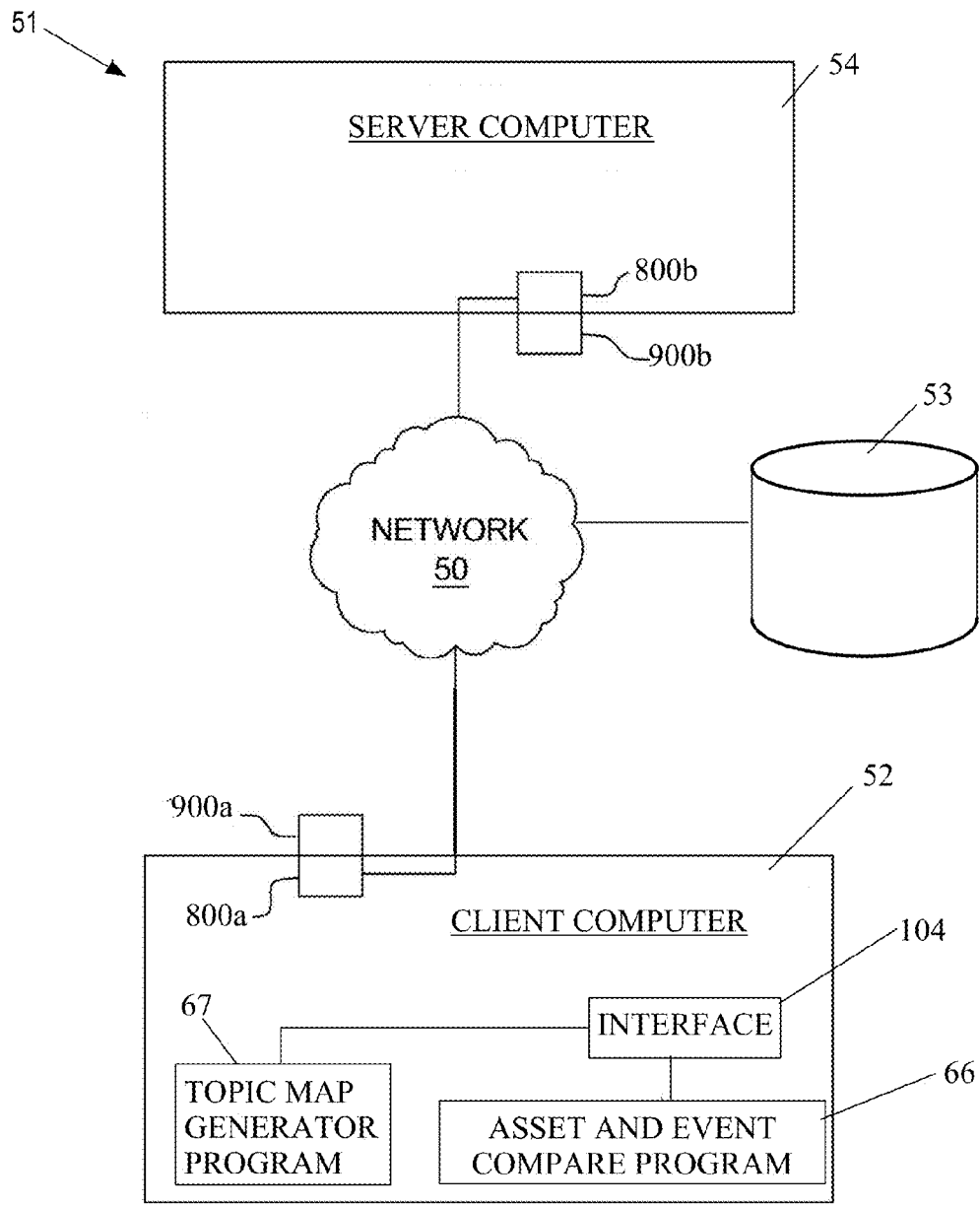
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 9. Client computer 52 may be, for example, a mobile device, a cell phone, a personal digital assistant, a netbook, a laptop computer, a tablet computer, a desktop computer, or any other type of computing device. Client computer 52 may contain an interface 104. Through interface 104, users may view different topic maps as well as a topic map meta-model which includes associations between assets and events. Additionally, through interface 104, any representation, for example graphs, of the weights may be displayed on the topic map including associations between assets and events. Interface 104 may accept commands and data entry from a user, such as additional events, assets, or queries. Interface 104 can be, for example, a command line interface, a graphical user interface (GUI), or a web user interface (WUI) through which a user can access an asset-and-event compare program 66 and/or a topic map generator program 67 on client computer 52, as shown in FIG. 1, or alternatively on server computer 54. Server computer 54 includes a set of internal components 800b and a set of external components 900b illustrated in FIG. 9.

In the depicted example, server computer 54 provides information, such as boot files, operating system images, and applications to client computer 52. Server computer 54 can compute the information locally or extract the information from other computers on network 50.

Figure 9:
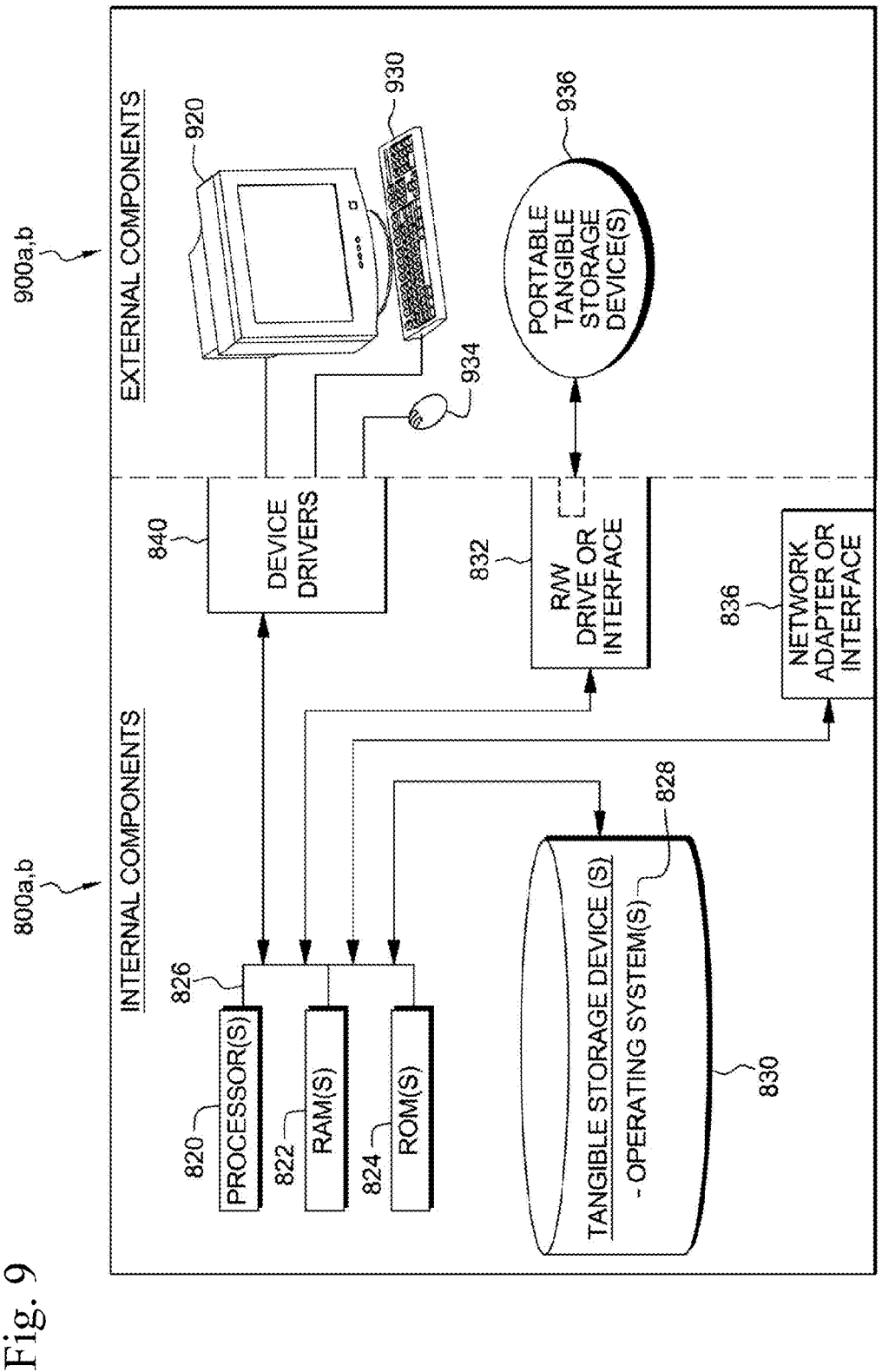
FIG. 9 illustrates internal and external components of a client computer and a server computer in which illustrative embodiments may be implemented.

Program code, meta-models, models identifying assets, models identifying events, models representing semantic mapping of assets to events, data structures identifying weights, and programs such as topic map generator program 67 and asset-and-event compare program 66 may be stored on at least one of one or more computer-readable tangible storage devices 830 shown in FIG. 9, on at least one of one or more portable computer-readable tangible storage devices 936 as shown in FIG. 9, or on storage unit 53 connected to network 50, or may be downloaded to a computer, such as client computer 52 or server computer 54, for use. For example, program code, meta-models, models identifying assets, models identifying events, data structures identifying weights and programs such as topic map generator program 67 and asset-and-event compare program 66 may be stored on at least one of one or more storage devices 830 on server computer 54 and downloaded to client computer 52 over network 50 for use on client computer 52. Alternatively, server computer 54 can be a web server, and the program code, meta-models, models identifying assets, models identifying events, data structures identifying weights, and programs such as topic map generator program 67 and asset-and-event compare program 66 may be stored on at least one of the one or more storage devices 830 on server computer 54 and accessed on client computer 52. Topic map generator program 67 and asset-and-event compare program 66 can be accessed on client computer 52 through interface 104. In other exemplary embodiments, the program code, meta-models, models identifying assets, models identifying events, data structures identifying weights, and programs such as topic map generator program 67 and asset-and-event compare program 66 may be stored on at least one of one or more computer-readable storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2B:
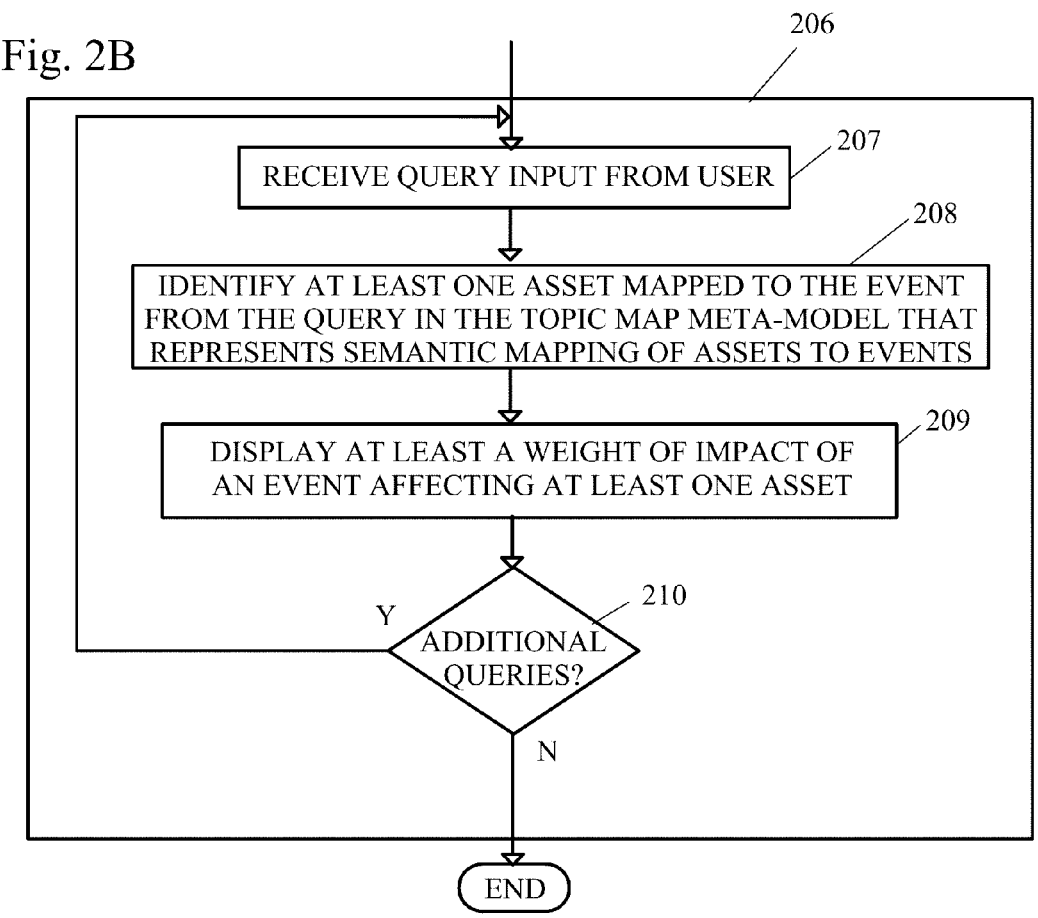
FIGS. 2b-2c show flowcharts of steps associated with searching topic map meta-models, according to illustrative embodiments.
Figure 2C:
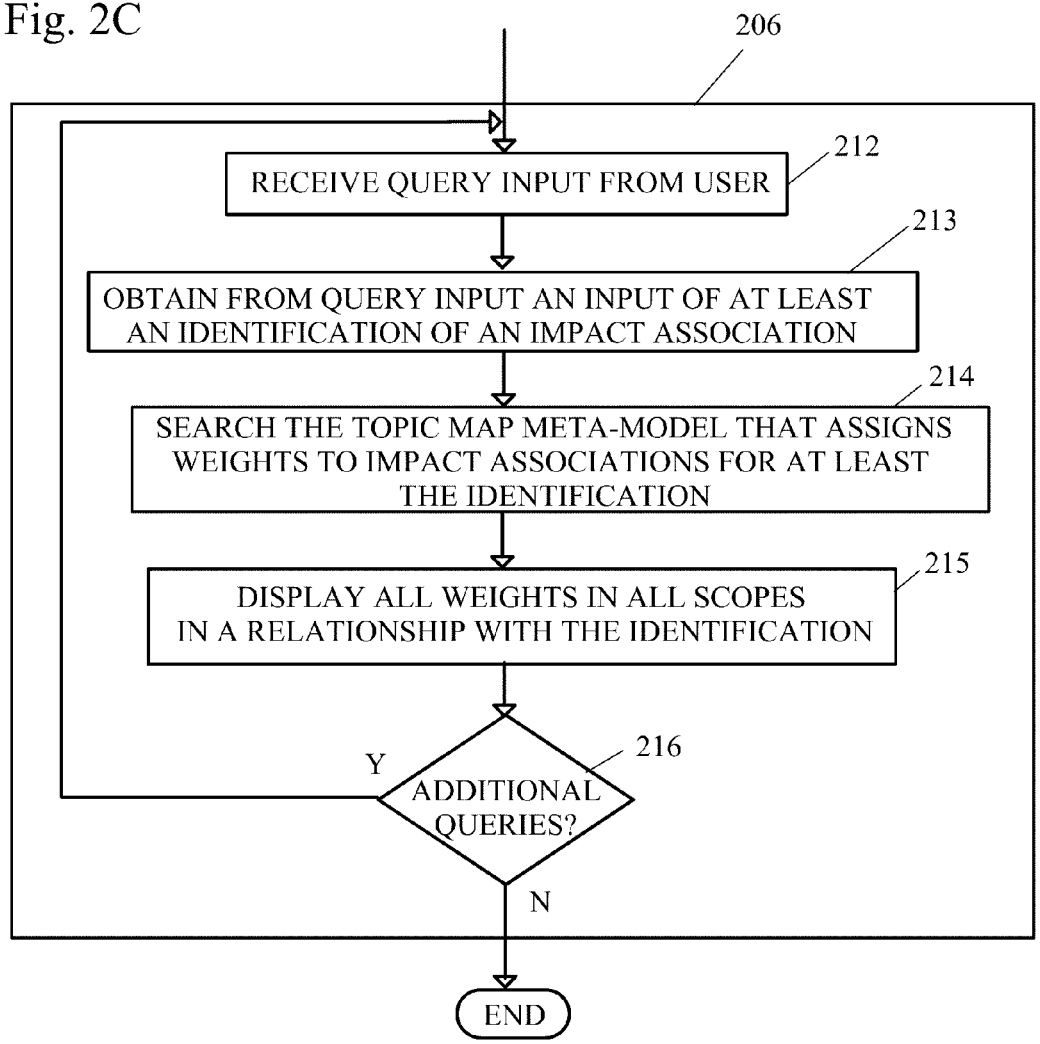

FIG. 2a shows a flowchart of a method of semantically mapping a first topic map meta-model identifying assets to a second topic map meta-model identifying events to form a third topic map meta model that represents semantic mapping of assets to events and assigning weights to the associations between the assets and events in the third topic map meta-model in various scopes identified within a meta-model and storing the weights in a data structure, the weights being indicative of a possible impact of an event on one or more assets, according to an illustrative embodiment. For simplicity, the weight described in the flowcharts of FIGS. 2a-2c is represented as a probability or likeliness that an event will affect at least one asset. In an alternate embodiment, the weight may be representative of a cost or an impact.

Figure 3:
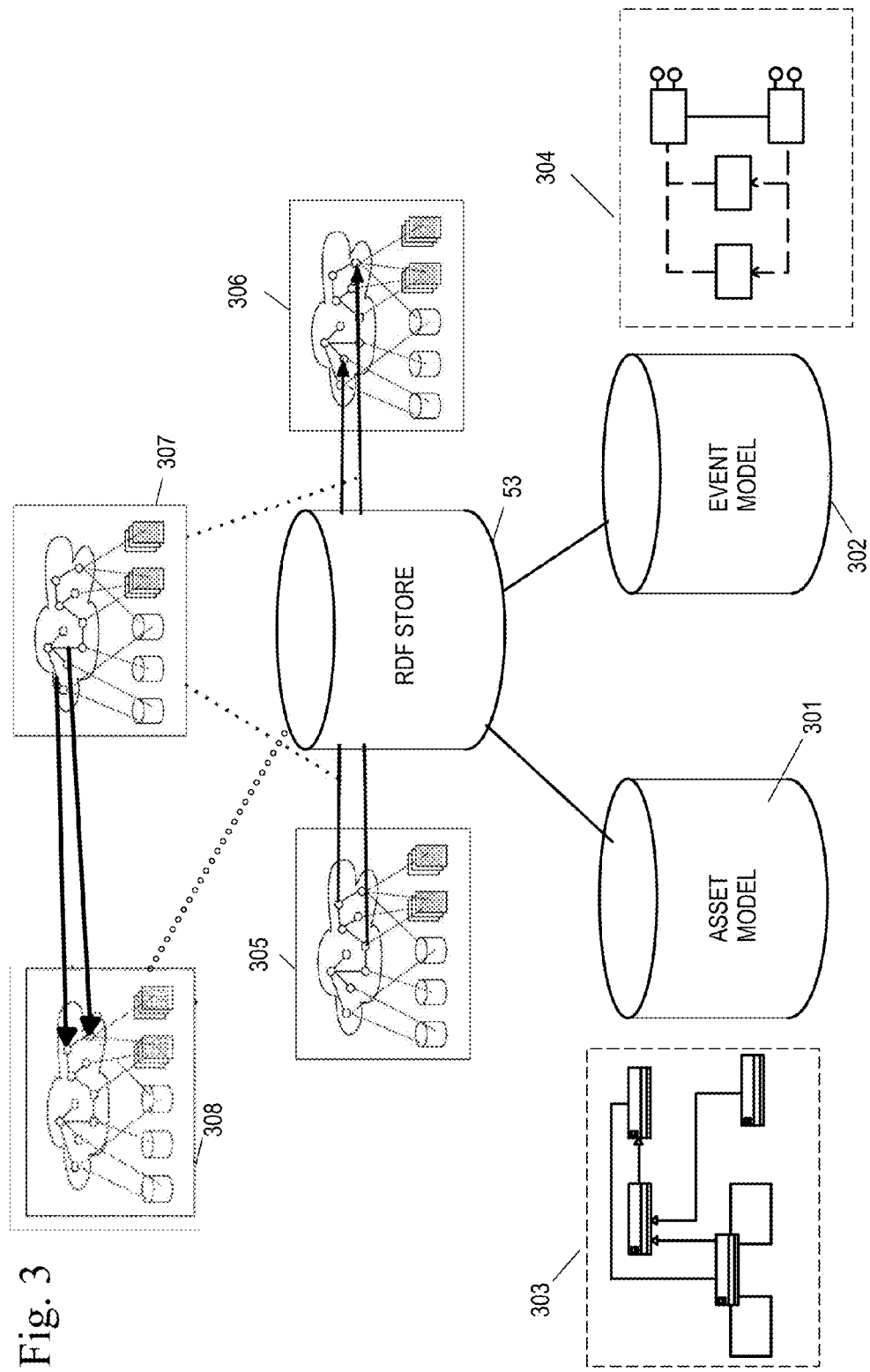
FIG. 3 shows an example of a possible relationship between a topic map meta-model that identifies assets, a topic map meta-model that identifies events, a topic meta-model that represents the semantic mapping of assets to events, and a topic map meta-model that identifies weights in various scopes.

Topic map generator program 67 creates a topic map meta-model, including a topic map based index and instance ontology, of a meta-model identifying assets and stores the created topic map meta-model identifying assets in a repository (step 201). The repository may be repository 301 as shown in FIG. 3. It should be noted that while separate repositories 301, 302 for the different meta-models are shown in FIG. 3, one repository may be used.

Topic map generator program 67 creates a topic map meta-model, including a topic map based index and instance ontology, for a meta-model identifying events and stores the created topic map meta-model identifying events in a repository (step 202). The repository may be repository 302 as shown in FIG. 3.

Asset-and-event compare program 66 creates a topic map meta-model that maps assets in the topic map meta-model created at step 201 to events in the topic map meta-model created at step 202 and stores the topic map meta-model that represents the semantic mapping of assets to events in a repository (step 203). The topic map meta-model that represents the semantic mapping of assets to events may be created manually by a person with knowledge of how specific events affect assets or by the asset-and-event compare program 66. Asset-and-event compare program 66 can recursively recreate the topic map meta-model that represents the semantic mapping of assets to events as new events are generated or additional assets are added. An association between an event and at least one asset in the topic map meta-model that represents the semantic mapping of assets to events is herein referred as an "impact association", meaning that an occurrence of the event may have an impact on the at least one asset.

Asset-and-event compare program 66 applies an identification to each impact association between at least one asset and an event in the topic meta-model that represents the semantic mapping of assets to events (step 204). Each identification of an impact association is preferably unique among the impact associations and may distinguish between impact associations that may occur in different scopes through identifiers. In the topic meta-model that represents the semantic mapping of assets to events, more than one impact association can be present between assets and events. Each impact association is between an event and at least one asset semantically mapped to the event.

Asset-and-event compare program 66 creates a topic map meta-model of identifications of an impact association between at least one asset and an event in the topic map meta-model that represents semantic mapping of assets to events and weights assigned to the impact associations and stores the topic map meta-model in a repository (step 205). The weights may be stored in a data structure. The data structure may be a meta-model which is part of the topic map meta-model of identifications of impact associations.

The weights are in a relationship with the identification applied to the association between at least one asset mapped to an event in the topic meta-model that represents the semantic mapping of assets to events. The weights used with the topic map meta-model are predefined within the meta-model and each represents an impact that an event may have on at least one asset in a specific scope.

Each identification applied to an impact association preferably includes an identifier corresponding to the association, an identifier of the topics of the association, an identifier of the impact of one of the topics on another topic in the association or the roles the topics play in the association, for example impactee vs. impactor, an identifier of the scope, and an identifier of a weight of the association in the corresponding scope.

Asset-and-event compare program 66 can also search topic map meta-models (step 206). FIG. 2b shows the steps associated with searching the topic map meta-models of a first embodiment with a query input specifying at least one asset and one event (step 207). The query may further include a scope.

The asset-and-event compare program 66 can receive the query input from a user through an interface, such as interface 104. Interface 104 may be a topic map interface, which may be a representational state transfer (REST) based interface, although other interfaces may be used. A REST interface is preferably used since REST is a standards-based Internet protocol and is self documenting in terms of how to do the search, for example which domain to search, and which topic to search.

In one embodiment, the query input includes at least one domain. For example, the query input can have the following syntax:

/search/<<domain>>/

The domain of the query input in this embodiment is the event applied to the overall system to be searched, for example the topic map meta-model that represents the semantic mapping of assets to events. An example of a query input received at step 207 to retrieve the weight that an event, in this case a rain gauge alert, has on at least one asset in the overall system to be searched is as follows:

/search/<<rain_gauge_alert>>/

It should be noted that the query input above may be artificially limited by and/or within the system being searched, for example within a specific city or region. Furthermore, the results of the query input may be further defined by the user.

Responsive to receiving this query input, asset-and-event compare program 66 can identify all rain gauges that have alerts within the system (e.g. city or region).

Alternatively, the query input may include at least one domain and at least one a topic. For example, the query input can have the following syntax:

/search/<<domain>>/<<topic>>/

The domain of the query input in this embodiment is the event to apply to the overall system to be searched. The topic of the query input is the asset(s) that the event may affect. An example of a query input received at step 207 to determine the weight that the event (a rain gauge alert, see topic map identifying events of FIG. 7) has on the asset(s) (WorkEquipment, see topic map identifying assets of FIG. 6) is as follows:

/search/<<domain>>/rain_gauge_alert/<<topic>>/Asset_WorkEquipment/

Responsive to receiving this query input, asset-and-event compare program 66 may return results regarding the weight or impact the rain gauge alert will have on a specific asset, the Asset_WorkEquipment.

In another embodiment, the query input may include at least one domain, at least one topic, and at least one scope. For example, the query input can have the following syntax:

/search/<<domain>>/<<topic>>/<<scope>>/

The domain of the query in this embodiment is the event to apply to the overall system to be searched, e.g. a rain gauge alert. The topic of the query input is the asset(s) that the event may affect and the scope is a subset of the overall system. An example of a query input received at step 206 to return the weight of the impact of the event on the asset (a rain gauge, see topic map identifying events of FIG. 7) on a specific asset (WorkEquipment, see topic map identifying assets of FIG. 6) in a determined scope (electric grid system) is as follows:

/search/<<domain>>/rain_gauge_alert/<<topic>>/Asset_WorkEquipment/<<scope>>/electric grid system/

The predefined weight of the impact association between the asset and the event, in this example WorkEquipment and rain gauge alert, may vary depending on the scope as determined in the meta-model identifying predefined weights mapped to identification of the impact associations between at least one asset and an event in the topic map meta-model that represents semantic mapping of assets to events. For example, in a City Operation system, a rain gauge alert can indicate that assets will be affected differently. If the asset of WorkEquipment were a storm drain with a rain gauge reading or alert, there may be a different weight or impact in the scope of an electrical grid system on the rain gauge reading or alert, than in the scope of a water system. For example, the rain gauge alert may have a weight that indicates that there will be a small impact on storm drains in the water system. Alternatively, the rain gauge alert may have a weight that indicates that there will be a large impact on electrical systems as the storm drain cannot adequately drain the water fast enough and the water may overflow to the electrical system. In this example, the two different types of scope would be the water system and the electric grid system, each with its own topic map meta-model identifying assets. In another embodiment, the scope may be time based.

Additionally, the search query may include a radix, which is the number of degrees from the search topic to be returned. For example, a search result based on a query input that contained a radix of 1 would display results directly connected to the search topic. A search result based on a query input that contained a radix of 2 would display results of everything directly connected to the search topic and directly connected to the matters directly connected to the search topic. For example, the query input can have the following syntax:

/search/TopicMapService/<<domain>>/event-to-asset/<<topic>>/ID1/<<scope>>/water/<<radix>>/1

The asset-and-event compare program 66 then identifies at least one asset mapped to the event from the query in the topic map meta-model that semantically maps assets to events created at step 203 (step 208).

Asset-and-event compare program 66 displays at least a weight associated with an event and the at least one asset to be displayed to the user (step 209).

If there are additional queries (step 210), return to step 206 of searching the topic map meta-models. If there are no additional queries (step 210), the method ends.

In another alternative embodiment, the identification or identifier itself of the impact association between the assets and events of the topic map meta-model that represents semantic mapping of assets to events and associated with the weights in various scopes may be specifically queried.

FIG. 2c shows the steps associated with searching the topic map meta-models of a second embodiment with a query input specifying at least an identification (step 212).

The asset-and-event compare program 66 can receive the query input from a user through an interface, such as interface 104. Interface 104 may be a topic map interface, which may be a representational state transfer (REST) based interface, although other interfaces may be used. A REST interface is preferably used since REST is a standards-based Internet protocol and is self-documenting in terms of how to do the search.

For example, the query input can have the following syntax:

/search/TopicMapService/<<domain>>/weight_topic-map/<<topic>>/ID1/

In this embodiment, the domain specifies the topic map meta-model in which to search for the topic.

The asset-and-event compare program 66 obtains, from the query input, at least an identification of an impact association to search for and where to search, e.g. the topic map meta-model that includes as assignment of weight to the impact associations (step 213). The asset-and-event compare program 66 then searches topic map meta-model that assigns weights to impact associations in a topic map meta-model created at step 205 for all of the weights associated with the identified impact association (step 214).

Asset-and-event compare program 66 displays all the weights in all the scopes in a relationship with the identified impact association (step 215). It should be noted that in different scopes, an impact of an event on at least one asset may be different.

If there are additional queries (step 216), return to step 206 of searching the topic map meta-models. If there are no additional queries (step 216), the method ends.

FIG. 3 shows an example of a possible relationship between a topic map meta-model identifying assets 305, a topic map meta-model identifying events 306, a topic map meta-model that represents the semantic mapping of assets to events 307, and a topic map meta-model 308 with associations between the assets and events in the third topic map meta-model and assigned weights.

Figure 8:
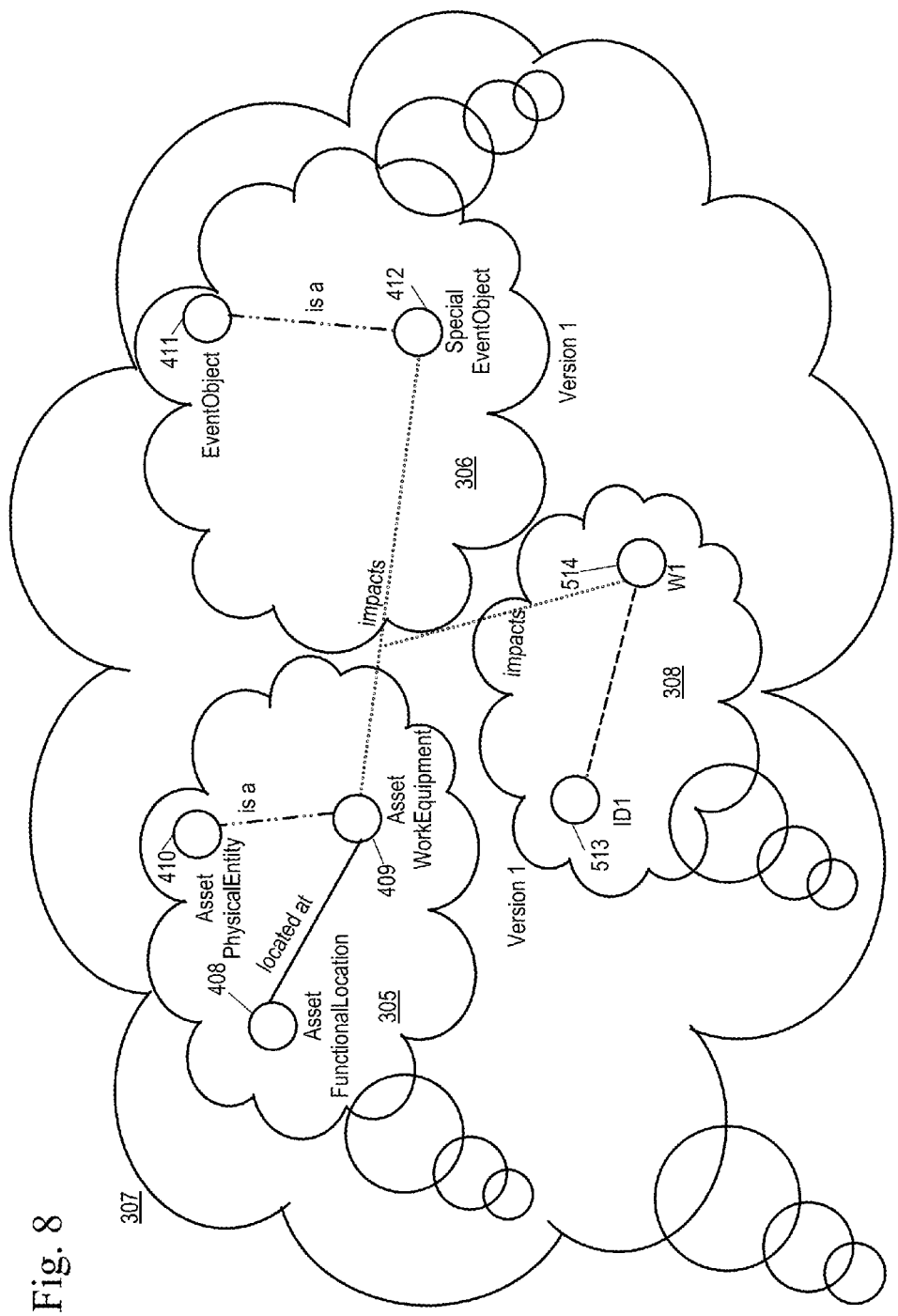
FIG. 8 shows an exemplary portion of a topic map representation of a meta-model identifying mappings of assets to events and an exemplary portion of a topic map representation of a meta-model identifying weights of the mappings.

Stored within the resource description framework (RDF) repository, for example repository 53, are RDF triples of the assigned topics, occurrences, and attributes of the topic map meta-model 308 that assigns weights to impact associations (shown in FIG. 8). The topics may provide the actual predefined weights or a link to the actual predefined weights.

Stored within a resource description framework (RDF) repository, for example repository 53, are RDF triples of the assigned topics, occurrences, and attributes of the topic map meta-model that identifies assets 305. An asset meta-model 303 in which topic map meta-model that identifies assets 305 is based may be stored within repository 53 or in a separate repository 301.

From a uniform modeling language (UML) representation 403 (shown in FIG. 4) of meta-model 303 which identifies assets, the RDF triples in Table 1 below represent an association between an Asset_WorkEquipment being connected to the other pieces of Asset_WorkEquipment. The relationship between Asset_WorkEquipment and other pieces of Asset_WorkEquipment is the type "equipment_connects".

Note that for brevity in the following discussion, the following RDF namespace prefixes will be used, with (URLx) replacing an actual Uniform Resource Locator designation, or other designation of a location on a network:

TABLE 1

| Prefix | Prefix |
|---|---|
| rdf_syntax | http |
| Foo | (URL1) |
| Anne | (URL2) |

Therefore, for foo#asset_Workequipment_Equipment Connects_Asset_WorkEquipment, the following RDF triples would be present in the RDF repository for the association between WorkEquipment and Asset_WorkEquipment.

TABLE 2

| Subject | Predicate | Object |
|---|---|---|
| foo#asset_workequipment_equipmentconnects_asset_workequipment | rdf_syntax#type | anne#association |
| foo#asset_workequipment_ | foo#type | foo#equipment_ |

TABLE 2-continued

| Subject | Predicate | Object |
|---|---|---|
| equipmentconnects_asset_workequipment | | connects |
| foo#asset_workequipment_equipmentconnects_asset_workequipment | . . . | . . . |

Stored within the resource description framework (RDF) repository, for example repository 53 are RDF triples of the assigned topics, occurrences, and attributes of topic map meta-model 306 that identifies events. An event meta-model 304 in which a topic map meta-model that identifies events 306 is based may be stored within repository 53 or in a separate repository 302.

From a UML representation 404 (shown in FIG. 5) of meta-model which identifies events 304, the RDF triples in Table 3 below represent an association between a Special EventObject being a type of EventObject. The relationship between Special EventObject and EventObject is the type "is_a". Therefore, for foo#specialEventObject_is_a_ EventObject, the following RDF triples would be present in the RDF repository for the association between Special EventObject and EventObject.

TABLE 3

| Subject | Predicate | Object |
|---|---|---|
| foo#specialEventObject_is_a_EventObject | Rdf-syntax#type | anne#association |
| foo#specialEventObject_is_a_EventObject | foo#type | foo#is_a |
| foo#specialEventObject_is_a_EventObject | . . . | . . . |

Figure 4:
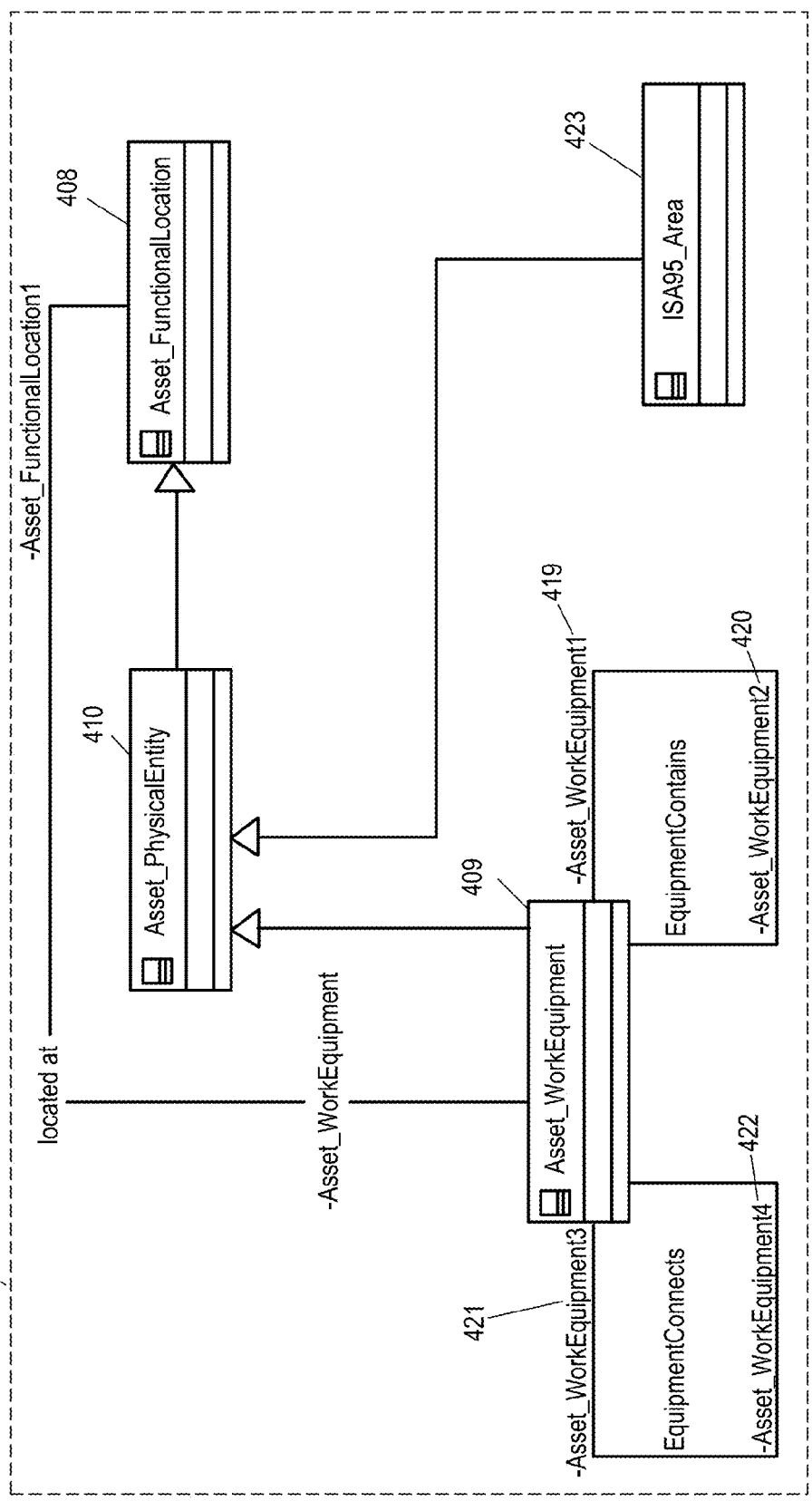
FIG. 4 shows an example of a UML representation of a meta-model identifying assets.

FIG. 4 shows an example of UML representation 403 of an asset meta-model 303 that identifies assets. Asset_WorkEquipment 409 is located at or has an occurrence at Asset_FunctionalLocation 408. Asset_WorkEquipment 409 has the attributes or plays the role of equipment and is an Asset_PhysicalEntity 410. The work equipment contained with the Asset_WorkEquipment 409 may include Asset_WorkEquipment1 419, which contains Asset_WorkEquipment2 420, and Asset_WorkEquipment3 421, which contains Asset_WorkEquipment4 422. ISA95_Area 423 is an Asset_Physical Entity 410. EquipmentContains, EquipmentConnects, and ISA95_Area 423 shown in FIG. 4 are not shown in FIG. 8 in order to focus the relationships that will occur in the topic map meta-model that represents semantic mapping of assets to events.

Figure 5:
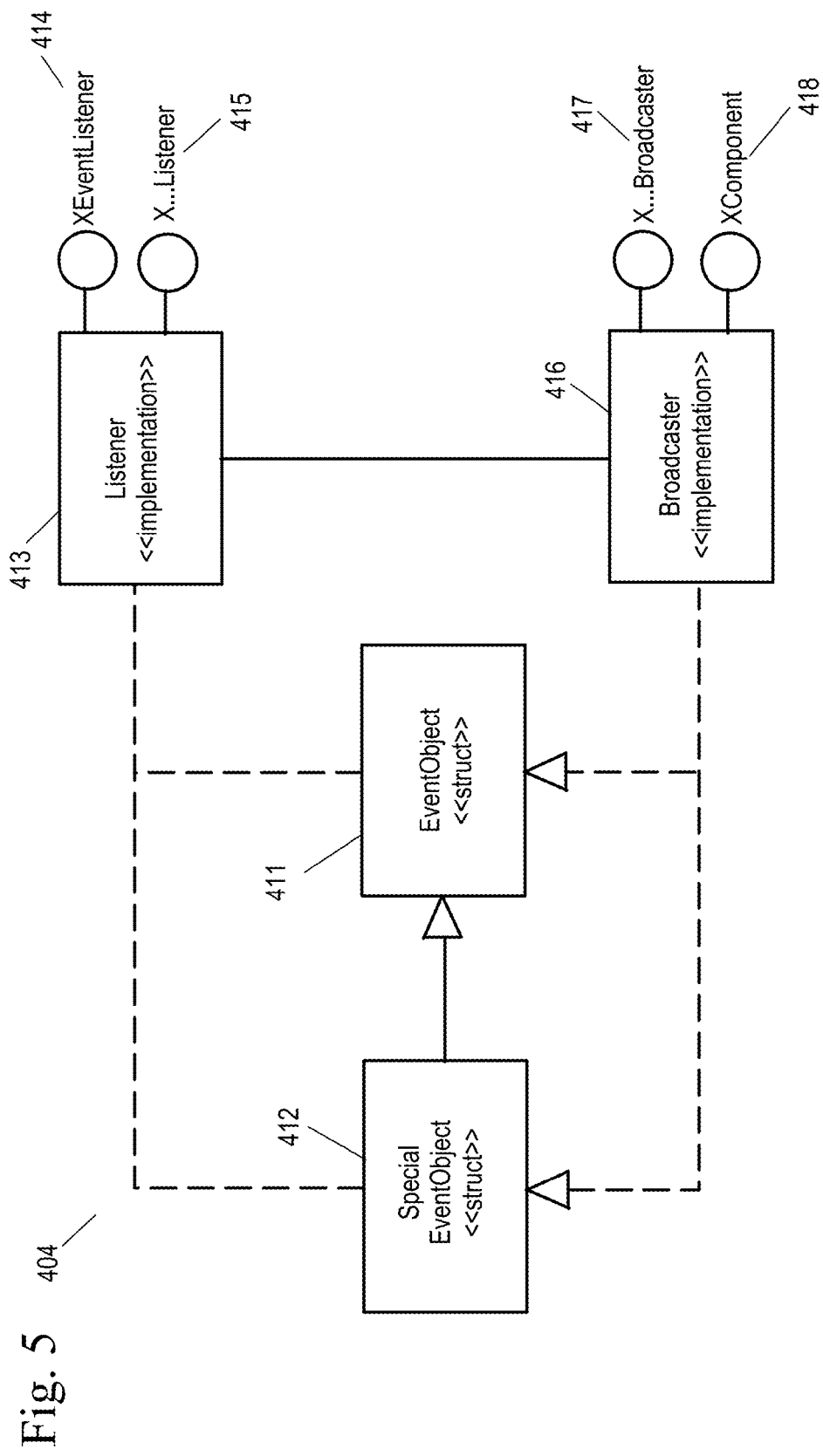
FIG. 5 shows an example of a UML representation of a meta-model identifying events.

FIG. 5 shows an example of a UML representation 404 of an event meta-model 304. A Broadcaster 416, which is an implementation of an event source and includes for example, X . . . Broadcaster 417 and XComponent 418, broadcasts events based on an EventListenerList to a Listener 413 (as shown by a solid line). It should be noted that for this application, the term "event" is defined as any predetermined occurrence that the event source considered significant enough to tell other objects about.

Listener 413 has event listeners, for example XEventListener 414 and X . . . Listener 415, which each receive information regarding event objects. An event object, for example EventObject 411 or Special EventObject 412, is an object that describes the nature of an event and stores properties and information regarding the event.

Broadcaster 416 is associated with EventObject 411 and Special EventObject 412 as shown by the dashed open arrowed lines. Special EventObject 412 is a type of Event Object 411 as indicated by the solid line and open arrow.

Figure 6:
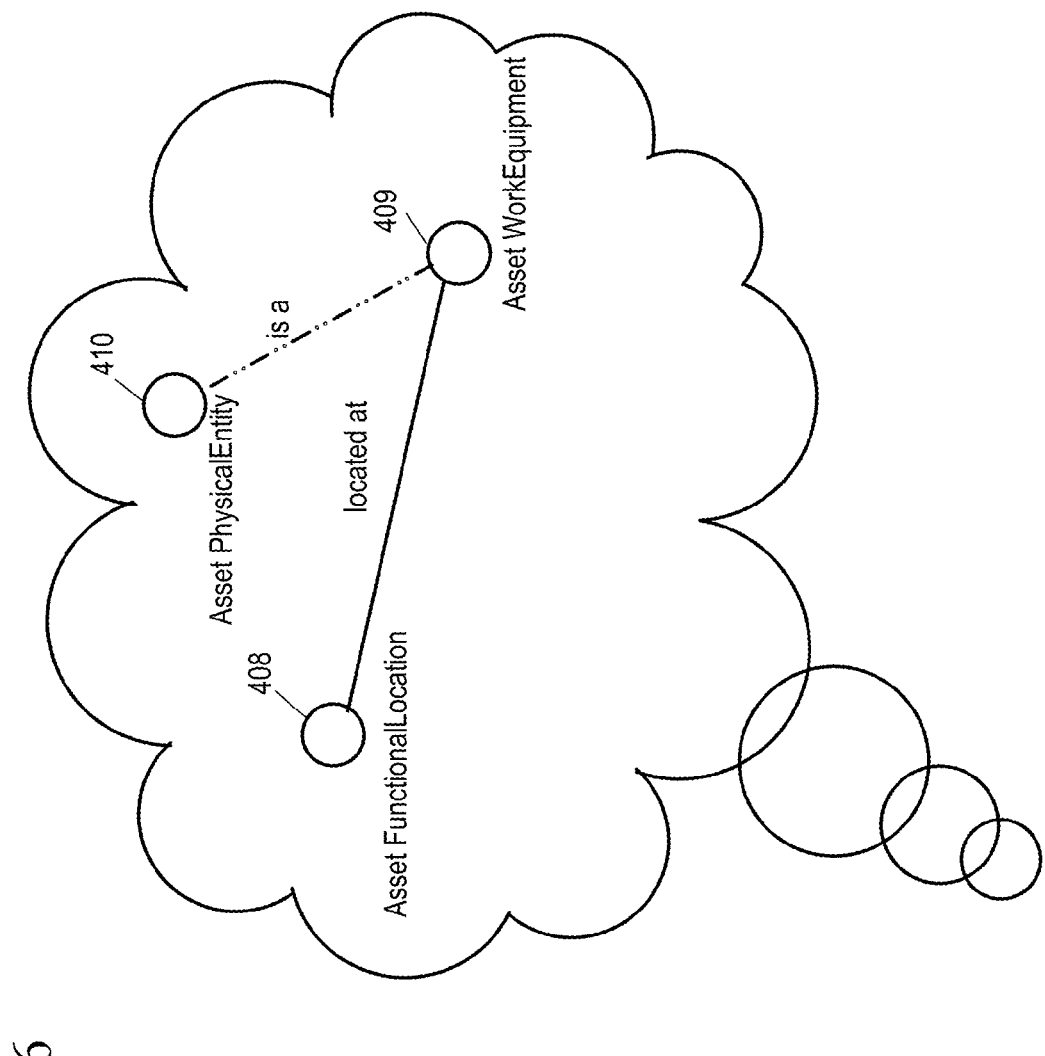
FIG. 6 shows an example of a portion of a topic map representation of a meta-model identifying assets.

FIG. 6 shows an example of a portion of a topic map representation 305 of meta-model 303. In FIG. 6, the portion of the topic map representation 305 of meta-model 303 shows only the relationship between Asset_WorkEquipment 409 and Asset_FunctionalLocation 408, and between Asset_WorkEquipment 409 and Asset_PhysicalEntity 410.

In the portion of the topic map representation 305 shown in FIG. 6, the topic of Asset_WorkEquipment 409 is located at or has an occurrence at Asset_FunctionalLocation 408 (shown by a solid line). The topic of Asset_WorkEquipment 409 has the attributes or plays the role of equipment and is a Asset_PhysicalEntity 410 (shown by a dash-dot-dot line). The topic Asset_FunctionalLocation 408 has the attributes or plays the role of location.

Figure 7:
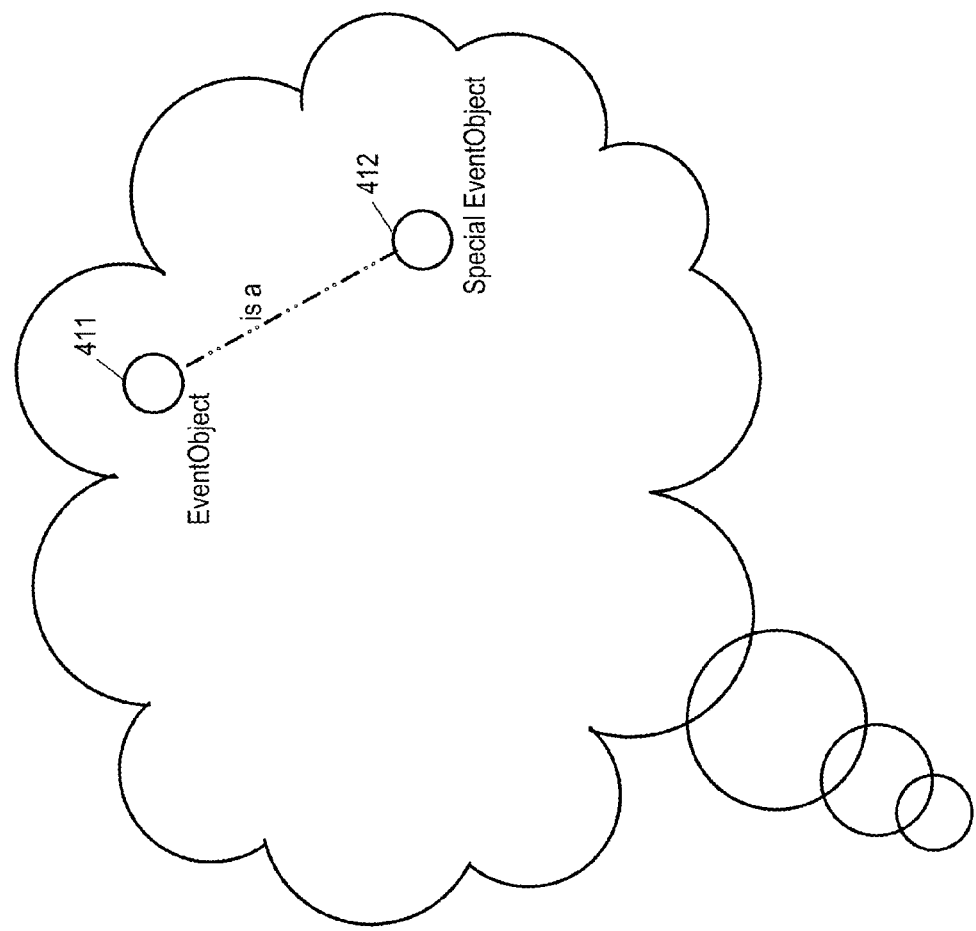
FIG. 7 shows an example of a portion of a topic map representation of a meta-model identifying events.

FIG. 7 shows an example of a portion of a topic map representation 306 of meta-model 304. In the portion of the topic map representation 306 shown in FIG. 7, the topic of Special EventObject 412 is an Event Object 411 (shown by the dash-dot-dot line). The topics of Listener and Broadcaster shown in FIG. 5 are not shown in FIG. 7 in order to focus the relationships that will occur in the topic map meta-model that represents the semantic mapping of assets to events 307.

FIG. 8 shows an exemplary portion of a topic map representation of the topic map meta-model that represents the semantic mapping of assets to events 307 and an exemplary portion of a topic map representation of the topic map meta-model in which weights are assigned to impact associations.

The topic map meta-model that represents the semantic mapping of assets to events 307 includes a topic map representation of assets of the topic map meta-model identifying assets 305 and a topic map representation of events of the topic map meta-model identifying events 306. The dotted line shows which topics impact other topics. The dotted line is present between the asset topics and event topics.

As in FIGS. 6 and 7, the solid line indicates "located at", and the dash-dot-dot line indicates "is a". Therefore, Special EventObject 412, which "is an" EventObject 411, has an impact on Asset_WorkEquipment 409, but does not affect Asset_FunctionalLocation 408 or the fact that Asset_WorkEquipment 409 is an Asset_PhysicalEntity 410.

Identification (ID1) 513 has a relationship (indicated by the dashed line) with weight (W1) 514, and the weight (W1) 514 is between the Asset_WorkEquipment 409 and the Special EventObject 412. The amount of impact of the Special EventObject 412 on the Asset_WorkEquipment 409 is equivalent to the weight (W1) 514 in a specific scope.

For every impact association between an asset and an event, an identification is present both in the topic map meta-model that represents the semantic mapping of assets to events and in the topic map meta-model in which weights are assigned to impact associations. The identification is unique to the association between the asset and event. As discussed earlier, an identification ID1 would include, an identifier corresponding to the association between the asset and the event (ID), an identifier of the topics of the association (T1, T2 . . . Tn), an identifier of the impact of one of the topics on another topic in the association or the roles the topics play in the association, for example impactee vs. impactor (R1, R2 . . . Rn), an identifier of the scope (S1, S2 . . . Sn), and the weight of the association (W1, W2 . . . Wn). The reference "n" being equivalent any number greater than zero.

In terms of FIG. 8, identification ID1 would include an identifier number associated with the specific association between Asset_WorkEquipment 409 and the Special EventObject 412, for example 10100, which may be stored in a repository for lookup. The identification ID1 also includes identifiers of the topics of the association and could for example be represented as T1 and T2, which may be stored in a repository for lookup. In FIG. 8, T1 would be equivalent to Special EventObject 412 and T2 would be equivalent to Asset_WorkEquipment. The topics T1 and T2 would also include information regarding the role in the association, for example topic T1 may be associated with the role R1 of impactor and topic T2 may be associated with the role R2, of the impactee in a specific scope S1. It should be noted that in certain scopes, the roles of the topics may not be the same. Furthermore, in certain scopes, the weights may change between the topics in the impacts association.

Therefore, based on FIG. 8, ID1 would include the following or make reference to the following identifiers being stored in a repository, for example repository 302, 53:
ID=10100
T1=Special EventObject
T2=Asset_WorkEquipment
R1=Special EventObject is the impactor
R2=Asset_WorkEquipment is the impactee
W1=70 (Seventy percent of the time the Special EventObject impacts the Asset_WorkEquipment
S1=scope 1

From this information, in an example, if the Asset_WorkEquipment was a storm drain and the Special EventObject was a rain gauge reading alert, the rain gauge reading alert would impact the storm drain 70 percent of the time in the scope of a city water system. The weight may be different regarding the impact that the rain gauge reading alert on the water drain from an electrical grid circuit scope or stand point and another weight, for example W2 could be associated with a different scope, scope S2.

FIG. 9 illustrates internal and external components of client computer 52 and server computer 54 in which illustrative embodiments may be implemented. In FIG. 9, client computer 52 and server computer 54 include respective sets of internal components 800*a*, 800*b*, and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, topic map generator program 67 and asset-and-event compare program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Topic map generator program 67 and asset-and-event compare program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Topic map generator program 67 and asset-and-event compare program 66 can be downloaded to client computer 52 and server computer 54 from an external computer via a network (for example, the Internet, a local area network or other, wide area network) and network adapter or interface 836. From the network adapter or interface 836, topic map generator program 67 and asset-and-event compare program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Topic map generator program 67 and asset-and-event compare program 66 can be written in various programming languages including low-level, high-level, object-oriented or non object-oriented languages. Alternatively, the functions of topic map generator program 67 and asset-and-event compare program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of determining an impact of an event identified in a first topic map meta-model will have on at least one asset identified in a second topic map meta-model representative as a weight, the method comprising the steps of:
   a computer creating a third topic map meta-model which maps at least one asset from the second topic map meta-model to an event from the first topic map meta-model, the third topic map meta-model comprising:
      a topic map representation of assets of the second topic map meta-model, the second topic map meta-model further comprising a topic map based index and instance ontology of a meta-model of assets;
      a topic map representation of events of the first topic map meta-model, the first topic map meta-model further comprising a topic map based index and instance ontology of a meta-model of events;
      identification of at least one association mapped between an event identified in the first topic map meta-model and at least one asset identified in the second topic map meta-model; and
         weight associated with the identification and assigned to the at least one-association between an event identified in a first topic map meta-model and an asset identified in a second topic map meta-model in various scopes;
   the computer receiving a query input from a user identifying an event;
   the computer obtaining from the query input, at least an identification of an association between at least one asset and an event in the third topic map meta-model;
   the computer searching the third topic map meta-model for the identification from the query input;
   the computer displaying all weights assigned to the association between the event in the first topic map meta-model and at least one asset of the second topic map meta-model in at least one scope to the user.

2. The method of claim 1, wherein the identification of the associations comprises the steps of:
   assigning an identifier in the third topic map meta-model to each of the associations between at least one asset and at least one event;
   identifying and assigning in the third topic map meta-model an identifier to the topics of the association and the roles of the topics in the association; and
   identifying and assigning in the third topic map meta-model an identifier to a scope of the association between at least one asset and at least one event of the event topic map meta-model.

3. The method of claim 1, further comprising the steps of:
   in response to a new event being added to the topic map meta-model identifying events, the computer re-creating the third topic map meta-model for the new event, adjusting the weight associated with the association in the third topic map meta-model, the re-created third map meta-model including a topic map based index and instance ontology for the new event and the adjusted weight; and
   the computer storing the re-created third topic map meta-model into a repository.

4. The method of claim 1, wherein the weights are stored in a data structure.

5. The method of claim 4, wherein the data structure is stored within the third topic map meta-model.

6. A computer program product of determining an impact of an event identified in a first topic map meta-model will have on at least one asset identified in a second topic map meta-model representative as a weight comprising a computer comprising at least one processor, one or more memories, one or more computer readable storage media, the computer program product comprising a computer readable storage medium having program instructions embodied therewith, the program instructions executable by the computer to perform a method comprising:
   creating, by the computer a third topic map meta-model which maps at least one asset from the second topic map meta-model to an event from the first topic map meta-model, the third topic map meta-model comprising:
      a topic map representation of assets of the second topic map meta-model, the second topic map meta-model further comprising a topic map based index and instance ontology of a meta-model of assets;
      a topic map representation of events of the first topic map meta-model, the first topic map meta-model further comprising a topic map based index and instance ontology of a meta-model of events;
   identifying by the computer, of at least one association mapped between an event identified in the first topic map meta-model and at least one asset identified in the second topic map meta-model; and
   assigning, by the computer, weight associated with the identification to the at least one association between an event identified in a first topic map meta-model and an asset identified in a second topic map meta-model in various scopes;
   receiving, by the computer, a query input from a user identifying an event;

obtaining, by the computer, from the query input, at least an identification of an association between at least one asset and an event in the third topic map meta-model;

searching, by the computer, the third topic map meta-model for the identification from the query input;

displaying, by the computer, all weights assigned to the association between the event in the first topic map meta-model and at least one asset of the second topic map meta-model in at least one scope to the user.

7. The computer program product of claim 6, wherein the program instructions of identification by the computer comprises the steps of:

assigning, by the computer, an identifier in the third topic map meta-model to each of the associations between at least one asset and at least one event;

identifying and assigning, by the computer, in the third topic map meta-model an identifier to the topics of the association and the roles of the topics in the association; and identifying and assigning, by the computer, in the third topic map meta-model an identifier to a scope of the association between at least one asset and at least one event of the event topic map meta-model.

8. The computer program product of claim 6, further comprising the program instructions to:

in response to a new event being added to the topic map meta-model identifying events, the computer re-creating the third topic map meta-model for the new event, adjusting the weight associated with the association in the third topic map meta-model, the re-created third map meta-model including a topic map based index and instance ontology for the new event and the adjusted weight; and storing, by the computer, the re-created third topic map meta-model into a repository.

9. The computer program product of claim 6, wherein the weights are stored in a data structure.

10. The computer program product of claim 9, wherein the data structure is stored within the third topic map meta-model.

11. A computer system of determining an impact of an event identified in a first topic map meta-model will have on at least one asset identified in a second topic map meta-model representative as a weight comprising a computer comprising at least one processor, one or more memories, one or more computer readable storage media having program instructions executable by the computer to perform the program instructions comprising:

creating, by the computer a third topic map meta-model which maps at least one asset from the second topic map meta-model to an event from the first topic map meta-model, the third topic map meta-model comprising:

a topic map representation of assets of the second topic map meta-model, the second topic map meta-model further comprising a topic map based index and instance ontology of a meta-model of assets;

a topic map representation of events of the first topic map meta-model, the first topic map meta-model further comprising a topic map based index and instance ontology of a meta-model of events;

identifying, by the computer, identification of at least one association mapped between an event identified in the first topic map meta-model and at least one asset identified in the second topic map meta-model; and assigning, by the computer, weight associated with the identification to the at least one association between an event identified in a first topic map meta-model and an asset identified in a second topic map meta-model in various scopes;

receiving, by the computer, a query input from a user identifying an event;

obtaining, by the computer, from the query input, at least an identification of an association between at least one asset and an event in the third topic map meta-model;

searching, by the computer, the third topic map meta-model for the identification from the query input;

displaying, by the computer, all weights assigned to the association between the event in the first topic map meta-model and at least one asset of the second topic map meta-model in at least one scope to the user.

12. The computer system of claim 11, wherein the program instructions of identification by the computer comprises the steps of:

assigning, by the computer, an identifier in the third topic map meta-model to each of the associations between at least one asset and at least one event;

identifying and assigning, by the computer, in the third topic map meta-model an identifier to the topics of the association and the roles of the topics in the association; and identifying and assigning, by the computer, in the third topic map meta-model an identifier to a scope of the association between at least one asset and at least one event of the event topic map meta-model.

13. The computer system of claim 11, further comprising the program instructions to:

in response to a new event being added to the topic map meta-model identifying events, the computer re-creating the third topic map meta-model for the new event, adjusting the weight associated with the association in the third topic map meta-model, the re-created third map meta-model including a topic map based index and instance ontology for the new event and the adjusted weight; and storing, by the computer, the re-created third topic map meta-model into a repository.

14. The computer system of claim 11, wherein the weights are stored in a data structure.

15. The computer system of claim 14, wherein the data structure is stored within the third topic map meta-model.

* * * * *